A. L. HAASE.
SAWMILL DOG.
APPLICATION FILED FEB. 18, 1920.
1,415,172.
Patented May 9, 1922.
2 SHEETS—SHEET 2.
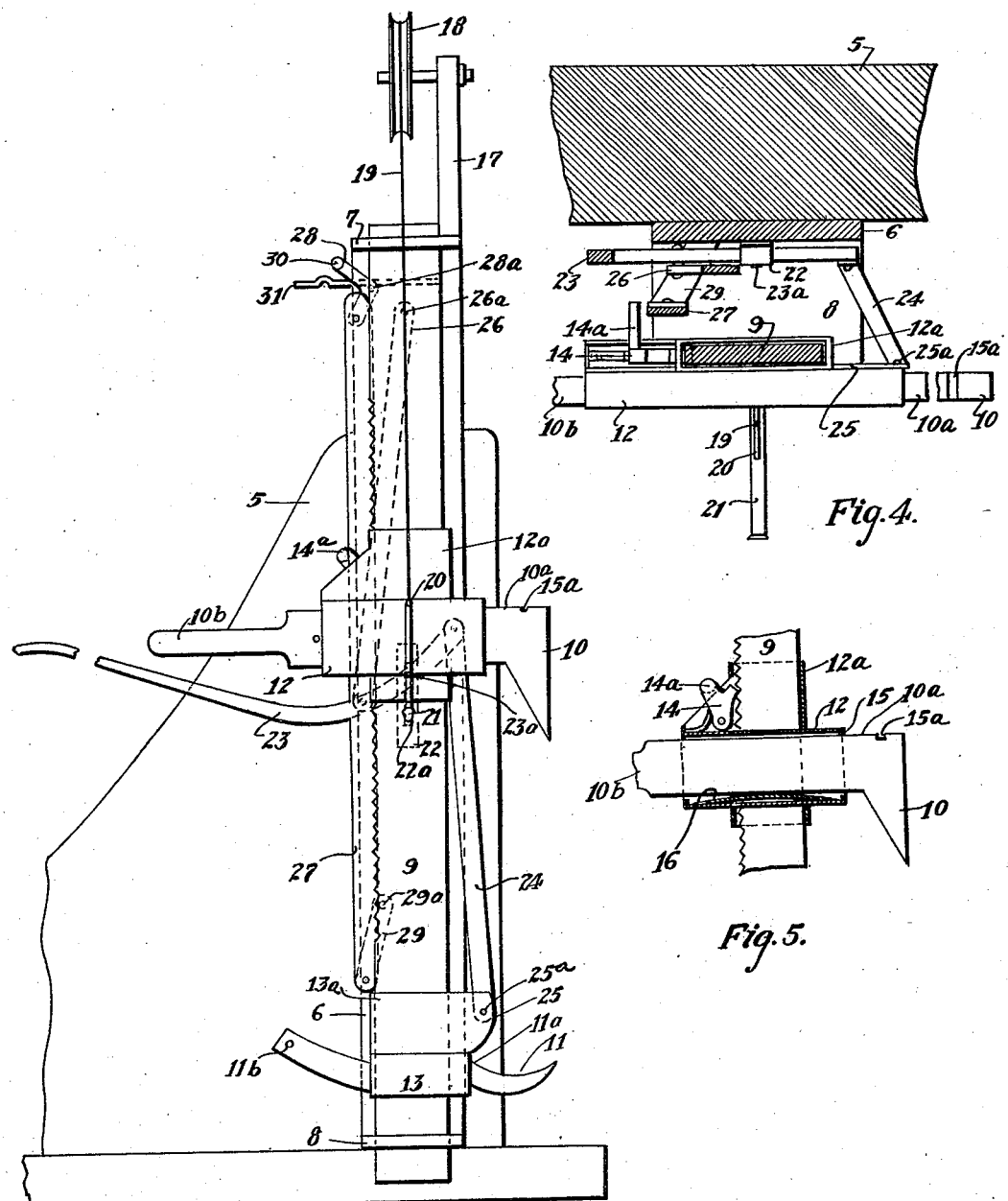
Inventor
A. L. Haase

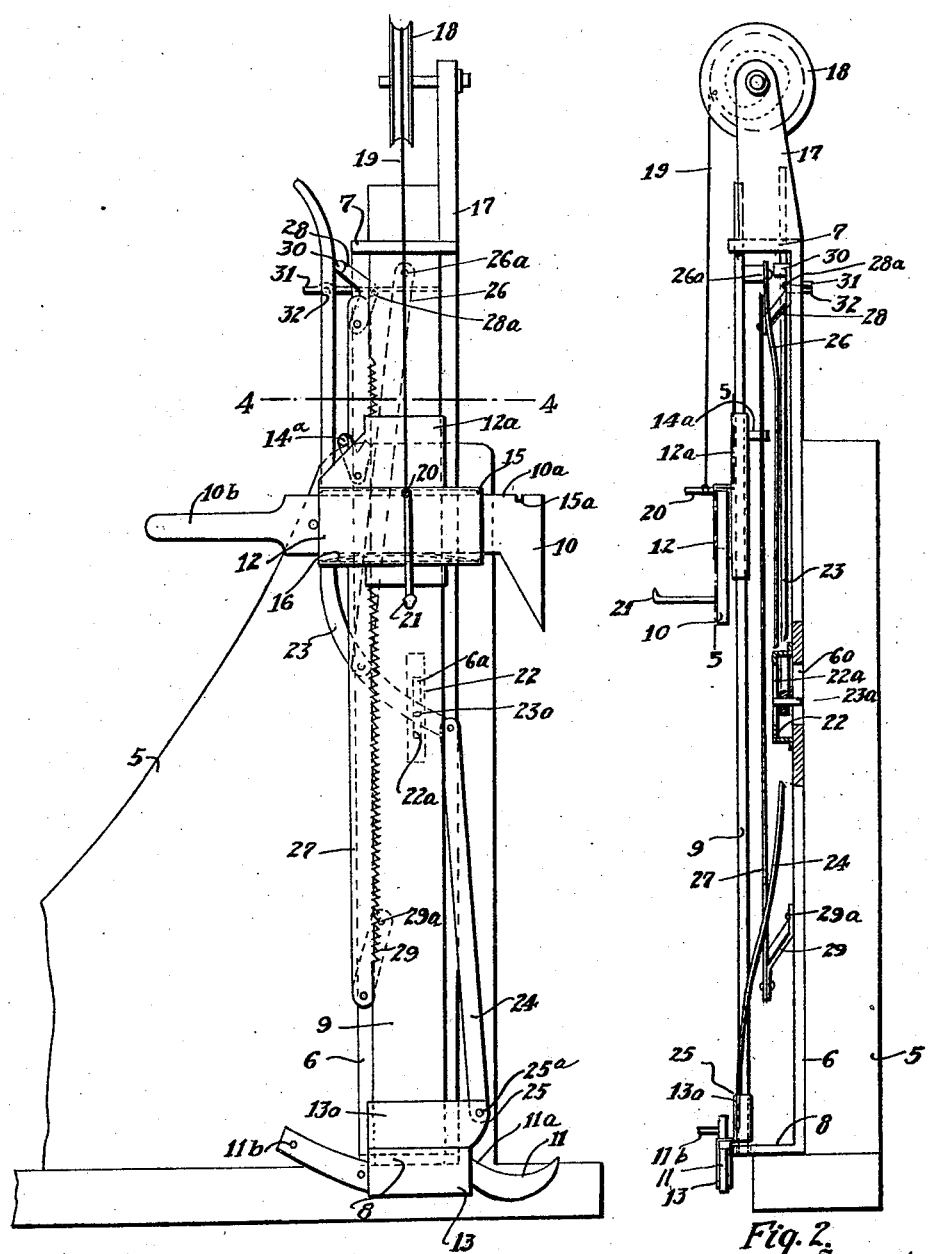

UNITED STATES PATENT OFFICE.

ADOLPH L. HAASE, OF NEW LONDON, WISCONSIN.

SAWMILL DOG.

1,415,172. Specification of Letters Patent. Patented May 9, 1922.

Application filed February 18, 1920. Serial No. 359,708.

*To all whom it may concern:*

Be it known that I, ADOLPH L. HAASE, a citizen of the United States, residing at New London, in the county of Waupaca and State of Wisconsin, have invented new and useful Improvements in Sawmill Dogs, of which the following is a specification.

This invention relates to devices for holding a log on the carriage of a saw-mill, and commonly known as saw-mill dogs.

The invention has for its object to provide a very efficient device of the kind stated, and one which can be easily and quickly operated to grip or release the log, and which is specially adapted for hardwood or frozen timber.

The object stated is attained by means of a novel combination and arrangement of parts to be hereinafter described and claimed, and in order that the same may be better understood, reference is had to the accompanying drawings forming a part of this specification.

In the drawings, Figure 1 is a side elevation of the device; Fig. 2 is a front elevation thereof partly broken away and in section; Fig. 3 is a view similar to Fig. 1 showing the parts in another position; Fig. 4 is an enlarged section on the line 4—4 of Fig. 1, and Fig. 5 is a sectional detail on the line 5—5 of Fig. 2.

Referring specifically to the drawings 5 denotes one of the knees of a saw-mill carriage, on which is rigidly mounted a standard 6 rising to a suitable height, and having outstanding top and bottom flanges 7 and 8, respectively, which are horizontal and provided with guide slots for a reciprocatory ratchet bar 9 carrying supports for upper and lower dogs 10 and 11, respectively.

The upper dog, 10 is on one end of a shank $10^a$ having its other end fashioned into a handle $10^b$. The shank $10^a$ is slidably supported in a bearing 12 having another bearing $12^a$ through which the ratchet bar 9 passes, said bearing $12^a$ being slidable on the ratchet bar. The dog 10 is therefore adjustable vertically as well as horizontally.

The bottom dog 11 is on one end of a shank $11^a$ having at its other end a laterally projecting foot piece $11^b$. The shank 11 seats in a bearing 13 having another bearing $13^a$, through which latter the ratchet bar 9 passes, said bearing $13^a$ being slidable on the ratchet bar. The dog 11 is therefore adjustable vertically.

The bearing 12 carries a spring-pressed pawl 14 positioned to engage the toothed edge of the ratchet bar 9 and thus lock said bearing stationary relative to the ratchet bar. The rear end of the pawl has a laterally extending abutment in the form of a pin $14^a$, the purpose of which will be presently made clear.

At the forward end of the bearing 12 is a tooth 15 adapted to enter a notch $15^a$ in the shank $10^a$ when said shank is drawn back to retract the dog 10, the shank being tilted upwardly to place the notch over the tooth by a spring 16 pressing on the bottom edge of the shank, the notch being in its top edge.

The top flange 7 of the standard 6 has a support 17 for a spring actuated drum 18 on which is wound a cable or other hoisting line 19 which extends downwardly and is fastened to a projecting pin 20 on the bearing 12. When the pawl 14 is disengaged from the ratchet bar 9, the spring-drum 18 rotates to wind up the line 19, thereby pulling the bearing 12 upwardly and thus elevating the dog 10. The pawl-and-ratchet locking means of the bearing 12 are so arranged that said bearing is free to be drawn down, the pawl 14 then slipping over the teeth of the ratchet bar 9, and said pawl taking hold to prevent upward movement of the bearing. From the bearing 12 projects a foot pedal 21 so that it may be forced down by the operator's foot.

The ratchet bar 9 is set spaced from the standard 6, and to the face of the latter is secured a fulcrum support 22 for a hand lever 23. The fulcrum support is a plate having a portion which is spaced from the standard so that the lever may seat between said plate and the standard. This spaced portion of the plate has a slot $22^a$ in which loosely seats a laterally extending pin $23^a$ on the lever 23, said pin being the fulcrum of the lever. The fulcrum pin also seats in a slot $6^a$ in the standard 6. The fulcrum pin is near one end of the lever and on one side of said pin the lever is connected by a link bar 24 to the bearing or support 13 of the lower dog 11, said link being pivoted to an ear 25 on the portion 13ª of said bearing, as shown at 25ª. On the other side of the fulcrum 23ª of the lever 23, said lever is connected by a link bar 26 to the upper end of the ratchet bar 9 as shown at 26ª. It will therefore be evident that when the lever 23 is swung down, the ratchet bar 9 is slid downwardly and at the same time the bearing 13 is slid upwardly, so that the dogs 10 and 11 approach each other. When the lever is swung upwardly the parts move in the opposite direction, and the two dogs separate.

Back of the ratchet bar 9 is also located a vertical trip bar 27 for the pawl 14. This bar is supported at its upper and lower ends by parallel links 28 and 29, respectively pivoted to the standard 6, as shown at 28ª and 29ª, respectively. The abutment or pin 14ª of the pawl 14 is positioned in the path of the bar 27 to intercept the same, and the top link 28 has an abutment 30 which is in the path of the lever 23 to intercept the same.

The upper end of the standard 6 has a latch bar 31 for holding the lever 23 at the limit of its upward swing, the lever having a side pin 32 to engage the latch bar.

In operation, the support of the top dog 10 is pushed downwardly on the ratchet bar 9 until it engages the log to be held, it being understood that the log is so placed that it is engaged from below by the bottom dog 11. The hand lever 23 is now swung down as shown in Fig. 3, whereupon the two dogs are made to travel toward each other as hereinbefore described, and they are forced into the log to firmly hold the same. To release the log, the lever 23 is swung upwardly as shown in Fig. 1 to spread the dogs, and when the lever strikes the abutment 30, the trip bar 27 is swung forwardly to come against the abutment 14ª of the pawl 14, thereby tripping said pawl off the ratchet bar 9, and allowing the top dog to be elevated by the cable 19. The parts are now in position for the next log.

I claim:

1. The combination of top and bottom saw-mill dogs, supports for said dogs, a reciprocatory ratchet bar on which the support of the top dog is slidably mounted, a pawl on said support for locking the top dog to the ratchet bar, means for moving the ratchet bar and the support of the bottom dog in opposite directions, and a pawl-tripping means actuated by the aforesaid means when operated to effect separation of the dogs.

2. The combination of top and bottom saw-mill dogs, supports for said dogs, a reciprocatory ratchet bar on which the support of the top dog is slidably mounted, a pawl on said support for locking the top dog to the ratchet bar, an operating lever, links connected to the lever, one of said links being connected to the ratchet bar, and the other link to the support of the bottom dog for moving said bar and support in opposite directions, means actuated by the lever for tripping the pawl when operated to effect separation of the dogs, and automatically operating means for elevating the top dog support when the pawl is tripped.

3. The combination of top and bottom saw-mill dogs, supports for said dogs, a reciprocatory ratchet bar on which the support of the top dog is slidably mounted, a pawl on said support for locking the top dog to the ratchet bar, an operating lever, links connected to the lever, one of said links being connected to the ratchet bar, and the other link to the support of the bottom dog for moving said bar and support in opposite directions, and means actuated by said lever for tripping the pawl off the ratchet bar.

4. The combination of top and bottom saw-mill dogs, supports for said dogs, a reciprocatory ratchet bar on which the support of the top dog is slidably mounted, a pawl on said support for locking the top dog to the ratchet bar, an operating lever, links connected to the lever, one of said links being connected to the ratchet bar, and the other link to the support of the bottom dog for moving said bar and support in opposite directions, a trip bar for disengaging the pawl from the ratchet bar, and parallel links supporting said trip bar, one of said links having an abutment which intercepts the lever.

5. The combination of top and bottom saw-mill dogs, supports for said dogs, a reciprocatory ratchet bar on which the support of the top dog is slidably mounted, a pawl on said support for locking the top dog to the ratchet bar, means for moving the ratchet bar and the support of the bottom dog in opposite directions, a pawl-tripping means actuated by the aforesaid means when operated to effect separation of the dogs, and automatically operating means for elevating the top dog support when the pawl is tripped.

6. The combination of top and bottom saw-mill dogs, supports for said dogs, a reciprocatory member on which the supports are loosely mounted, means for locking the support of the top dog to the reciprocatory member, and means for moving said member and the support of the bottom dog in opposite directions, and means for operating the aforesaid locking means to release the top dog support, said releasing means being controlled by the aforesaid means by which the reciprocatory member and the bottom dog support are moved.

7. The combination of top and bottom saw-mill dogs, supports for said dogs, a reciprocatory member on which the supports are loosely mounted, means for locking the support of the top dog to the reciprocatory member, means for moving said member and the support of the bottom dog in opposite directions, means for operating the aforesaid locking means to release the top dog support, said releasing means being controlled by the aforesaid means by which the reciprocatory member and the bottom dog support are moved, and automatically operating means for elevating the top dog support when the same is released.

In testimony whereof I affix my signature.

ADOLPH L. HAASE.